(12) United States Patent
Shu (10) Patent No.: US 8,798,483 B2
(45) Date of Patent: Aug. 5, 2014

(54) APPARATUS AND METHOD FOR SELFADAPTING DISPERSION COMPENSATION

(75) Inventor: Huade Shu, Shenzhen (CN)

(73) Assignee: ZTE Corporation (CN)

( * ) Notice: Subject to any disclaimer, the term of this patent is extended or adjusted under 35 U.S.C. 154(b) by 875 days.

(21) Appl. No.: 12/096,674

(22) PCT Filed: Dec. 20, 2005

(86) PCT No.: PCT/CN2005/002248
§ 371 (c)(1),
(2), (4) Date: Jun. 9, 2008

(87) PCT Pub. No.: WO2007/071104
PCT Pub. Date: Jun. 28, 2007

(65) Prior Publication Data
US 2008/0279565 A1    Nov. 13, 2008

(51) Int. Cl.
*H04J 14/02* (2006.01)
*H04B 10/12* (2006.01)
*H04B 10/00* (2013.01)
*H04B 10/06* (2006.01)

(52) U.S. Cl.
USPC ............. 398/209; 398/81; 398/147; 398/158; 398/159; 398/208

(58) Field of Classification Search
CPC ...... H04B 10/00; H04B 10/07; H04B 10/079; H04B 10/0795; H04B 10/07951; H04B 10/0799; H04J 14/0227
See application file for complete search history.

(56) References Cited

U.S. PATENT DOCUMENTS

| 6,320,687 B1 * | 11/2001 | Ishikawa ....................... 398/147 |
| 2002/0039217 A1 * | 4/2002 | Saunders et al. .............. 359/161 |

(Continued)

FOREIGN PATENT DOCUMENTS

| CA | 2453012 A1 | 6/2005 |
| CN | 1211119 A | 3/1999 |

(Continued)

OTHER PUBLICATIONS

Koe; "Adaptive Opto-Electronic Compensator for Excessive Filtering, Chromatic and Polarization Mode Dispersion"; Mar. 2005; 3 pages.

*Primary Examiner* — Kenneth N. Vanderpuye
*Assistant Examiner* — Darren E Wolf
(74) *Attorney, Agent, or Firm* — Brooks Kushman P.C.

(57) ABSTRACT

The present invention discloses an apparatus and method for adaptive dispersion compensation, the apparatus comprising: a coarse-grain tunable dispersion compensator, a receiver with electric adaptive dispersion compensator, and a control logic unit. In the method, firstly it is to perform optical dispersion compensation for the input optical signals; then to perform electric dispersion compensation for the optical signals for which the optical dispersion compensation is performed; it is to detect the performance parameters of the receiving of the optical signals for which the electric dispersion compensation has been performed, and based on the performance parameters, it is to perform optical dispersion compensation adjustment for said input optical signals. With an optical de-multiplexer further, said apparatus can perform adaptive dispersion compensation for the multi-channel system. By using the apparatus and method for adaptive dispersion compensation of the present invention, it significantly reduces the number of adjustments as well as decreases the dispersion compensation time and can fast and accurately realize a wide range of adaptive dispersion compensation for either single channel or multi-channel.

21 Claims, 6 Drawing Sheets

(56) References Cited

U.S. PATENT DOCUMENTS

2002/0123851 A1* 9/2002 Kurooka et al. ............ 702/69
2002/0126355 A1   9/2002 Bulow
2003/0011847 A1* 1/2003 Dai et al. .................. 359/161
2004/0151426 A1* 8/2004 Boertjes et al. ............ 385/24

FOREIGN PATENT DOCUMENTS

| CN | 1561017 A | 1/2005 |
|----|-----------|--------|
| WO | 2004077111 A2 | 9/2004 |

* cited by examiner fig. 1 Prior Art fig. 2 Prior Art fig. 3 Prior Art fig. 4  Prior Art fig. 5 fig. 6 fig. 7 fig. 8 fig. 9 fig. 10 fig. 11 fig. 12

APPARATUS AND METHOD FOR SELFADAPTING DISPERSION COMPENSATION

TECHNICAL FIELD

This invention relates to an optical transmission system and particularly to an apparatus and method for adaptive dispersion compensation for performing dispersion adaptive compensation for optical signals.

TECHNOLOGY BACKGROUND

With the fast development of the optical communication technology, the optical communication system develops in the direction of high-speed, high-capacity, long-distance and intelligence, etc. Currently, the DWDM (Dense Wavelength Division Multiplexing) optical communication system with 160 channels and 10 Gb/s single channel speed is already commercially applied, as well as the ASON (Automatically Switched Optical Network) system based on intelligent circuit-switching. In the future, there will be an optical network system with much larger capacity and much higher speed (40 Gb/s or above), meanwhile there will also appear intelligent optical network system with functions like OXC (Optical Cross Connect) or ROADM (Reconfigurable Optical Add/Drop Multiplexer).

Figure 1:
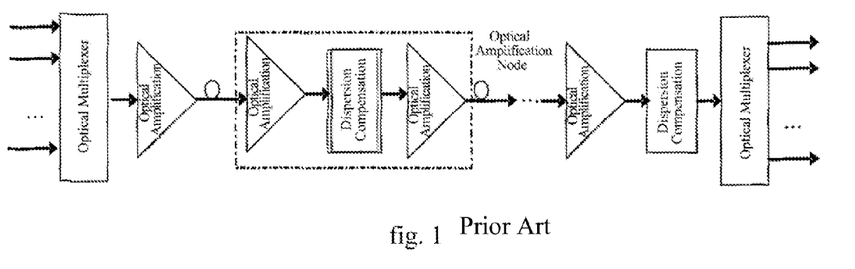
FIG. 1 is a schematic diagram of the dispersion compensation method in the traditional optical communication system in the background technology.

In the super high speed optical transmission system, dispersion and PMD (Polarization Mode Dispersion) will deteriorate the optical signal quality and reduced the transmission distance. In order to expand the transmission distance of the optical transmission system, some measures need to be taken to compensate dispersion and PMD. In the traditional optical communication system, it mostly adopts the fixed dispersion compensators to compensate the dispersion of the optical transmission path. FIG. 1 is a diagram of the dispersion compensation method for the traditional optical communication system. By adopting dispersion compensation, it ensures that the residual dispersion of the optical signals at the receiver can be controlled within the range of which the receiver can tolerate. The dispersion compensator is generally realized by using dispersion compensation fiber module. The dispersion compensation module can be placed in the optical terminal station or optical regeneration station. In the optical terminal station, the dispersion compensation module is often used to perform dispersion compensation function for the multi-channel optical signals of DWDM system after multiplexing or before de-multiplexing. In the optical regeneration station, it usually adopts two-stage optical amplifier structure and a dispersion compensation fiber module can be placed between the two stage amplifiers to realize multi-channel dispersion compensation.

For the long-distance optical transmission system, factors such as temperature, pressure and the like will cause tiny changes of the dispersion parameter of the link fiber. As a result, the real-time changes of the optical signal dispersion value in the optical path accumulates as the distance of the total transmission increases, which will probably lead to the result that the signal residual dispersion at the receiving end goes beyond the tolerance range and deteriorates the system bit error performance.

With the increase of the single channel transmission speed, the dispersion accommodation of the optical source will decrease. For the optical signals at the speed of 10 Gb/s without chirp, the dispersion accommodation is about 1000 ps/nm; however for the optical signals at the speed of 40 Gb/s without chirp, the dispersion accommodation is about 40 ps/nm, which is only equivalent to the 2 km transmission distance of the 1550 nm window of G.652 fiber. Therefore, for the 40 Gb/s system, since the source dispersion accommodation is relatively small, any tiny changes of the link fiber dispersion value will cause the signal residual dispersion at the receiving end to go beyond the tolerance range, thereby deteriorating the system bit error performance. So influence of the change of the optical fiber dispersion on the 40 Gb/s system performance is particularly obvious.

On the other hand, with the development of the intelligent optical networks, the ROADM and even the OXC nodes will be incorporated into the optical network. In these optical network nodes, the dynamic add-drop multiplexing of the optical signals as well as the dynamic optical cross-connect will cause changes of the dispersion value of the optical signals in the optical path, which will cause the signal residual dispersion at the receiving end to go beyond the tolerance range and deteriorate the system bit error performance.

In summary, the above factors indicate that with the optical communication system developing in the direction of high-speed, high-capacity, long-distance and intelligence, and after the optical signals are transmitted in the link, the signal residual dispersion value at the receiving end will constantly change because of the dispersion value changes of the link and the optical network nodes. It is necessary to perform adaptive dispersion compensation for the signals that have constantly changeable residual dispersion value. How to realize the adaptive dispersion compensation is a key question in the present technology area.

The adaptive dispersion compensation of the optical transmission system could be realized by using the tunable dispersion compensator which could be realized either in optical field or in the electric field.

Figure 2:
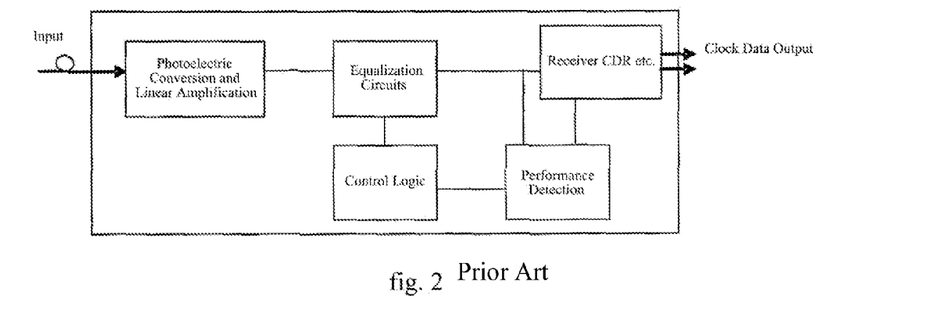
FIG. 2 is a schematic diagram of the optical communication system with adaptive dispersion compensation that has adaptive electric equalization function in the background technology.

There are many methods for realizing electric dispersion compensation, as shown in FIG. 2 which is a schematic diagram of the receiver with electric dispersion compensation function. After photoelectric conversion and linear amplification, the optical signals are transmitted to equalization circuit; by checking the electrical signal quality after equalizing, taking certain controlling measures and using the performance of the feedback control equalizer, adaptive dispersion compensation can be realized. The characteristic of this method is: easy realization of the method, fast response speed, but small dispersion compensation range; it could only realize the single channel dispersion compensation. The equalization circuits used for electric dispersion compensation could be FFE (Feed-forward Equalizer), DFE (Decision Feedback Equalizer), FDTS (Fixed Delay Tree Search) or MLSE (Maximum Likelihood Sequence Estimation), or a combination thereof. The electric dispersion compensation technology has smaller compensation dispersion value, for example, for the 10 Gb/s signal, the electric dispersion compensation is equivalent to adding 20-40 km transmission distance in the G.652 fiber.

Figure 3:
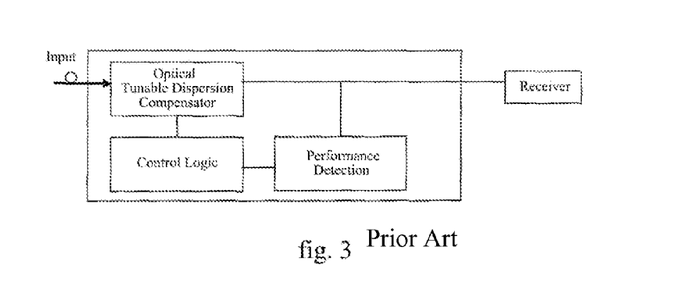
FIG. 3 is a schematic diagram of the communication system with optical tunable dispersion compensator that has adaptive dispersion compensation function in the background technology.

FIG. 3. is a schematic diagram of the optical tunable dispersion compensator in realizing adaptive dispersion compensation. Adaptive dispersion compensation function can be realized by checking the system residual dispersion or detecting the system bit error performance as well as controlling the dispersion compensation value of control tunable dispersion compensator through feedback. There are many methods in realizing optical tunable dispersion compensation, including CFBG (Chirped Fiber Bragg Grating) technology, G-T (Gires-Toumois) based interference technology, MEMS (Micro Electro Mechanical Systems) based technology, PLC (Planner Lightwave Circuit) circular resonator technology and multi-stage DCM (Dispersion Compensation Module) cascade, etc.

Figure 4:
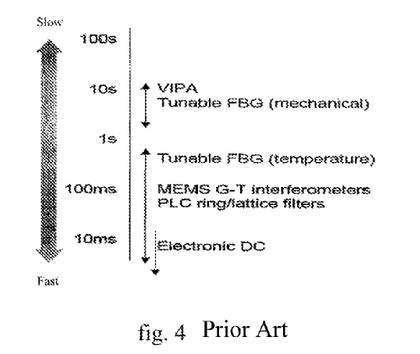
FIG. 4 is a comparison diagram of the response time of different dispersion compensators in the background technology.

Different dispersion technologies have different response time for compensating dispersion. As shown in FIG. 4, it lists the response time of several tunable dispersion compensators, in which the EDC (Electric Dispersion Compensation) has the shortest response time, almost reaching the order of magnitude below millisecond; while the optical tunable dispersion compensator has longer time for adjusting, from tens of millisecond to tens of seconds; VIPA (Virtual Imaged Phased Arrays) technology has the longest response time, which almost reaches the order of magnitude of second.

The performance detected by the adaptive dispersion compensator could be the system bit error; this dispersion compensation method needs to adjust through feedback multiple rounds based on the bit error performance. Considering the fact that the single round response time of the optical tunable dispersion compensator is relatively longer when compared to EDC, thus the total response time will be longer.

The performance detected by the adaptive dispersion compensator can also be the residual dispersion or the shape of the optical signal. However, the technology in the dispersion compensation method for realizing the detection for residual dispersion and optical signal shape is complicated, thus it is hard to realize. Among these methods, the detection precision and the detection time of residual dispersion will directly affect the performance of the adaptive dispersion compensator; what's more, the adjusting process of the adaptive dispersion compensation usually requires several rounds of adjustments, which significantly increases the time for adjusting of dispersion.

It can be seen that if the adaptive dispersion compensation is realized by directly detecting the residual dispersion, the non-linear effect, the PMD effect (Polarization Mode Dispersion) and the like will directly affect the dispersion detection precision; while the indirect dispersion detection method by using error detection often requires several rounds of adjustments before completion, thus the response time is relatively longer. The pure electric dispersion compensation technology generally has smaller compensation range.

SUMMARY OF THE INVENTION

The technical problem that needs to be solved in the present invention is to provide an apparatus and method for adaptive dispersion compensation in order to overcome the limitations of the current technology, so that in the intelligent and high-speed optical network, adaptive dispersion compensation for the optical transmission system dispersion can be realized fast and in real time.

The present invention provides an apparatus for adaptive dispersion compensation which is used for the adaptive dispersion compensation in the optical communication system, comprising:

A coarse-grain tunable dispersion compensator, which is used to perform the optical dispersion compensation for the input optical signals;

A receiver with the electric adaptive dispersion compensator, which is used to perform electric dispersion compensation for said optical signals for which the optical dispersion compensation has been performed;

A control logic unit, which is used to detect performance parameters of the receiver after the electric dispersion compensation, and based on said performance parameter, it controls said coarse-grain tunable dispersion compensator through feedback and performs optical dispersion compensation adjustment for said input optical signals.

The present invention also provides a method for adaptive dispersion compensation which is used for the adaptive dispersion compensation in the optical communication system. It comprises the following steps of:

(1) performing optical dispersion compensation for input optical signals;

(2) performing electric dispersion compensation for the optical signals for which the optical dispersion compensation has been performed;

(3) detecting the performance parameters of the receiving of the optical signals for which the electric dispersion compensation has been performed, and performing optical dispersion compensation adjustment for said input optical signals based on said performance parameters.

In said step (1), the coarse-grain tunable dispersion compensator is used to perform optical dispersion compensation on the input signals; in step (2), the receiver is used to perform electric dispersion compensation for the input signals; in step (3) a control logic unit is used to detect the performance parameters of said receiver after electric dispersion compensation has been performed, based on said performance parameters, it controls said coarse-grain tunable dispersion compensator through feedback and performs optical dispersion compensation adjustment for said input optical signals.

Said step (3) comprises:

(3-1) performing optical dispersion compensation adjustment for several rounds for said input optical signals, and recording the optical dispersion compensation value used in each adjustment as well as the detected corresponding performance parameters of the receiving after optical dispersion compensation and electric dispersion compensation have been performed;

(3-2) based on the detected performance parameter of the receiving after each adjustment, determining the preferred optical dispersion compensation value, which is used to perform optical dispersion compensation for said input optical signals.

The step of determining the preferred optical dispersion compensation value in said step (3-2) comprises:

selecting the optimal performance parameter from the detected performance parameters of the receiving after each adjustment, and determining the corresponding optimal optical dispersion compensation value based on the optimal performance parameter.

The present invention further provides an apparatus for adaptive dispersion compensation which is used for the adaptive dispersion compensation in the multi-channel optical communication system, comprising:

a coarse-grain tunable dispersion compensator, which is used to perform the optical dispersion compensation for the input optical signals;

an optical de-multiplexer, which is used to de-multiplex the optical signals for which the optical dispersion compensation has been performed into multiple single-channel optical signals;

multiple receivers with electric adaptive dispersion compensators, which are used to perform electric dispersion compensation for each received said single-channel optical signal which has been de-multiplexed;

a control logic unit, which is used to detect each receiver's performance parameters after the electric dispersion compensation has been performed, and based on said performance parameters it controls coarse-grain tunable dispersion compensator through feedback and performs optical dispersion compensation adjustment for said input optical signals.

The present invention further provides a method for adaptive dispersion compensation which is used for the adaptive dispersion compensation in the multi-channel optical communication system. It comprises the following steps of:

(1) performing optical dispersion compensation for the input optical signals;

(2) de-multiplexing the optical signals for which the optical dispersion compensation has been performed into multiple single-channel optical signals;

(3) performing electric dispersion compensation for each single-channel optical signal which has been de-multiplexed;

(4) detecting the performance parameters of the receiving of the optical signals for which the electric dispersion compensation has been performed, and performing optical dispersion compensation adjustment for said input optical signals based on said performance parameters.

In said step (1), the coarse-grain tunable dispersion compensator is used to perform optical dispersion compensation for the input signals; in step (2), the optical de-multiplexer is used to perform de-multiplexing for the input signals; in step (3), the receiver is used to perform electric dispersion compensation for each single-channel optical signal; in step (4) a control logic unit is used to detect the performance parameters of said receiver after the electric dispersion compensation has been performed, controls said coarse-grain tunable dispersion compensator through feedback based on said performance parameters, and performs optical dispersion compensation adjustment for said input optical signals.

Said step (4) comprises:

(4-1) performing optical dispersion compensation adjustment for several rounds for said input optical signals and recording the optical dispersion compensation value used in each adjustment as well as the detected corresponding performance parameters of the receiving after optical dispersion compensation and electric dispersion compensation have been performed;

(4-2) based on the detected performance parameter of the receiving after each adjustment, determining preferred optical dispersion compensation value of each single-channel optical signal, and from the values determining preferred optical dispersion compensation value of the entire system and using the selected preferred optical dispersion compensation value of the system to perform optical dispersion compensation for said input optical signals.

The step of determining the preferred optimal optical dispersion compensation value of each single-channel optical signal in said step (4-2) comprises:

selecting the optimal performance parameter of each single-channel optical signal from the detected performance parameters of the receiving after each adjustment, and determining the corresponding optimal optical dispersion compensation value based on the optimal performance parameter.

The step of determining preferred optical dispersion compensation value of the entire system in said step (4-2) comprises:

selecting the optimal performance parameter of the entire system from the preferred performance parameters of each single-channel optical signal, and determining the corresponding optimal optical dispersion compensation value of the whole system based on the optimal performance parameter.

Said apparatus and method for adaptive dispersion compensation in the present invention employs the way of combining wide-range optical dispersion compensation with small-range electric dispersion compensation. Under the condition that the link dispersion changes, it significantly reduces the number of rounds of dispersion adjustment and decreases the dispersion compensation time, and realizes a fast and accurate adaptive dispersion compensation for the optical signals in a wide range.

PREFERRED EMBODIMENTS OF THE INVENTION

The technical solution of said equipment and said method of the present invention will be further described in detail with reference to the drawings and the preferred embodiments of the present invention.

The core object of present invention is to fast the optimized dispersion compensation, thus the system uses both electric adaptive dispersion compensator (EDC) and optical tunable dispersion compensator. The optical tunable dispersion compensator used in the present invention could be the rough tunable dispersion compensation device, namely the coarse-grain tunable dispersion compensator. By using the EDC technology, the receiver is enabled to quickly find out the best dispersion compensation working point in a certain residual dispersion range according to the signal quality after equalization; while by using the optical tunable dispersion compensator, dispersion compensation of relatively large grain can be realized, thus enlarging the dispersion compensation range.

Figure 5:
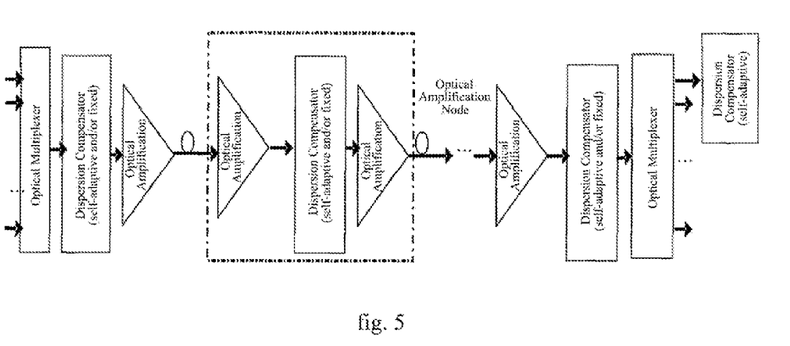
FIG. 5 is a diagram of the multi-channel optical communication system with adaptive dispersion compensation function according to the embodiment of the present invention.

FIG. 5 is a diagram of the location of the adaptive dispersion compensator in the multi-channel or single-channel optical communication system in the present invention. It can be seen that the system dispersion compensation could be divided into two parts, namely the fixed link dispersion compensation and the adaptive dispersion compensation. The adaptive dispersion compensator and the fixed link dispersion compensation could be realized on the sending and receiving sides as well as at the link optical amplifying nodes of the system. The adaptive dispersion compensation apparatus could be a distributed system, namely the coarse-grain tunable dispersion compensator does not need to be at the same node with the electric adaptive dispersion compensator of the receiver, the coarse-grain tunable dispersion compensator can be located at any point of the optical path in the system optical channel in front of the electric adaptive dispersion compensator corresponding to the channel to be compensated. The control information of the coarse-grain tunable dispersion compensator could be passed from the node where the electric adaptive dispersion compensator is located to the node where the coarse-grain tunable dispersion compensator is located through any physical channel.

Figure 6:
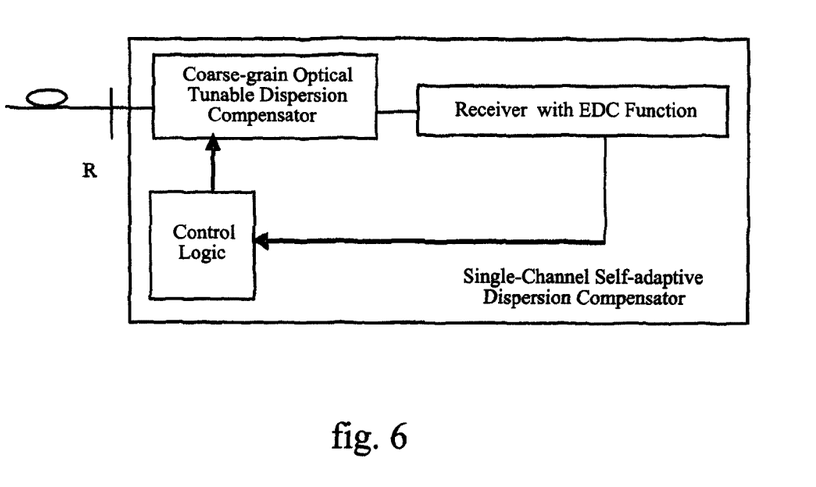
FIG. 6 is a diagram for a single-channel optical communication system with adaptive dispersion compensation function according to the embodiment of the present invention.
Figure 7:
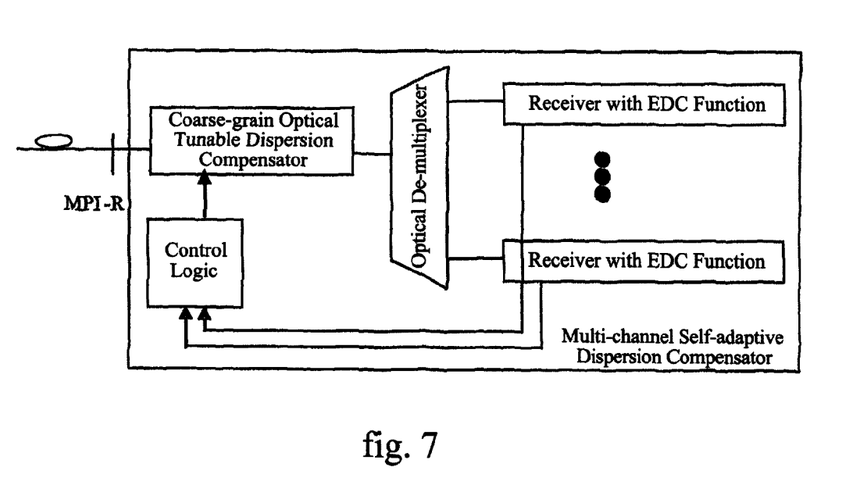
FIG. 7 is a diagram for a multi-channel optical communication system with adaptive dispersion compensation function according to the embodiment of the present invention.

FIG. 6 and FIG. 7 are principle diagrams for the adaptive dispersion compensation apparatus in the present invention and are respectively applied in the single-channel and multi-channel system. In the present invention, the adaptive dispersion compensation can be divided into two parts, namely the optical large-grain tunable dispersion compensation and the electric adaptive dispersion compensation. In the present invention, the optical large-grain tunable dispersion compensator uses the detected single-channel characteristic after the electric adaptive dispersion compensation and applies a certain policy to perform dispersion compensation by feedback control.

As shown in FIG. 6, it is a adaptive dispersion compensation apparatus which is used in the single-channel system, comprising:

a coarse-grain tunable dispersion compensator, which is used to realize the single-channel or multi-channel dispersion compensation in large range;

a receiver with the electric adaptive dispersion compensation function; the electric adaptive dispersion compensator is used to realize single-channel dispersion compensation in small range;

a control logic unit, which is used to detect the performance parameters of the receiver after electric adaptive dispersion compensation, and controls the coarse-grain tunable dispersion compensator through feedback based on the principle of optimizing the performance parameters of said channel signals after electric adaptive dispersion compensation by utilizing a certain control scheme, so as to adjust the dispersion compensation amount of the coarse-grain tunable dispersion compensator until the optimal dispersion compensation is reached.

The scheme for the control logic unit in controlling the coarse-grain tunable dispersion compensator could be as follows: the control logic unit firstly determines whether the channel performance parameters after electric adaptive dispersion compensation are such deteriorated that optical dispersion compensation tuning is needed; if they are, it starts to adjust the dispersion compensation value of the coarse-grain tunable dispersion compensator; after adjusting the dispersion compensation value of the coarse-grain tunable dispersion compensator each time, when the electric adaptive dispersion compensator reaches the optimal dispersion compensation value, it detects the performance parameters of said channel signals after electric adaptive dispersion compensation; furthermore, according to the comparison of the coarse-grain tunable dispersion compensator under different dispersion compensation conditions and based on the principle of optimizing the performance parameters of said channel signals after electric adaptive dispersion compensation, it analyzes to obtain the optimal dispersion compensation value of the optical dispersion compensator, with which, it finally sets the dispersion compensation value of the optical dispersion compensator as this optimal value, then the adaptive dispersion compensation is completed.

The performance parameters of the receiver detected by the control logic unit after electric adaptive dispersion compensation could be the error rate of the signal, the Q value of the signal and other parameters that could reflect the signal quality; for the system that utilizes the FEC (Forward Error Correction) technology, it could also be the error rate detected by FEC before correction;

The coarse-grain tunable dispersion compensator could be various device that employs CFBG (Chirped Fiber Bragg Grating) technology, G-T (Gires-Tournois) based interference technology, MEMS (Micro Electro Mechanical Systems) technology, PLC (Planner Lightwave Circuit) spherical resonator technology as well as the devices that employ multi-stage DCM (Dispersion Compensation Module) cascade and use optical switch to control to realize different dispersion compensation values. Besides, it can be any other device that can achieve the function of dispersion compensation.

As shown in FIG. 7, it is a adaptive dispersion compensation equipment used in multi-channel system, comprising:

a coarse-grain tunable dispersion compensator, which is used to realize single-channel or multi-channel dispersion compensation in large range;

a receiver with the electric adaptive dispersion compensation function; the electric adaptive dispersion compensator is used to realize single-channel dispersion compensation in small range;

an optical demultiplexer, which is used to de-multiplex the optical signal after optical dispersion compensation; it divides the signal into multiple single-channel signals;

a connected control logic unit, which is used to detect the performance parameters of the receiver after electric adaptive dispersion compensation and control the coarse-grain tunable dispersion compensator through feedback based on the principle of optimizing the performance parameters of said channel signals after electric adaptive dispersion compensation by utilizing a certain control scheme so as to adjust the dispersion compensation amount of the coarse-grain tunable dispersion compensator until the optimal dispersion compensation is achieved.

Based on the performance parameters for said channel signals after electric adaptive dispersion compensation, the scheme for the control logic unit in controlling the coarse-grain tunable dispersion compensator could be as follows:

the control logic unit firstly determines whether the channel performance parameters of each channel after electric adaptive dispersion compensation are such deteriorated that the optical dispersion compensation tuning is needed; if they are, it starts to adjust the dispersion compensation value of the coarse-grain tunable dispersion compensator; after adjusting the dispersion compensation value of the coarse-grain tunable dispersion compensator each time, when the electric adaptive dispersion compensator in each channel reaches the optimal dispersion compensation value, it detects the performance parameters of said channel signals after the electric adaptive dispersion compensation; furthermore, according to the comparison of the coarse-grain tunable dispersion compensator under different dispersion compensation conditions and based on the principle of optimizing the performance parameters of said channel signals after the electric adaptive dispersion compensation, it analyzes to obtain the optimal dispersion compensation value of the optical dispersion compensator, with which, it finally sets the dispersion compensation value of the optical dispersion compensator for each channel as the optimal value, thus the adaptive dispersion compensation is completed.

The performance parameters of the receiver detected by the control logic unit after electric adaptive dispersion compensation could be the error rate of the signal, the Q value of the signal and other parameters that could reflect the signal quality; for the system that utilizes the FEC (Forward Error Correction) technology, it could also be the error rate detected by FEC before correction;

The coarse-grain tunable dispersion compensator could be the device that employs CFBG (Chirped Fiber Bragg Grating) technology, G-T (Gires-Tournois) based interference technology, MEMS (Micro Electro Mechanical Systems) based technology, PLC (Planner Lightwave Circuit) spherical resonator technology as well as the device that employs multi-stage DCM (Dispersion Compensation Module) cascade and use optical switch to control to realize different dispersion compensation values. Besides, it can be any other device that can achieve the function of dispersion compensation.

Figure 8:
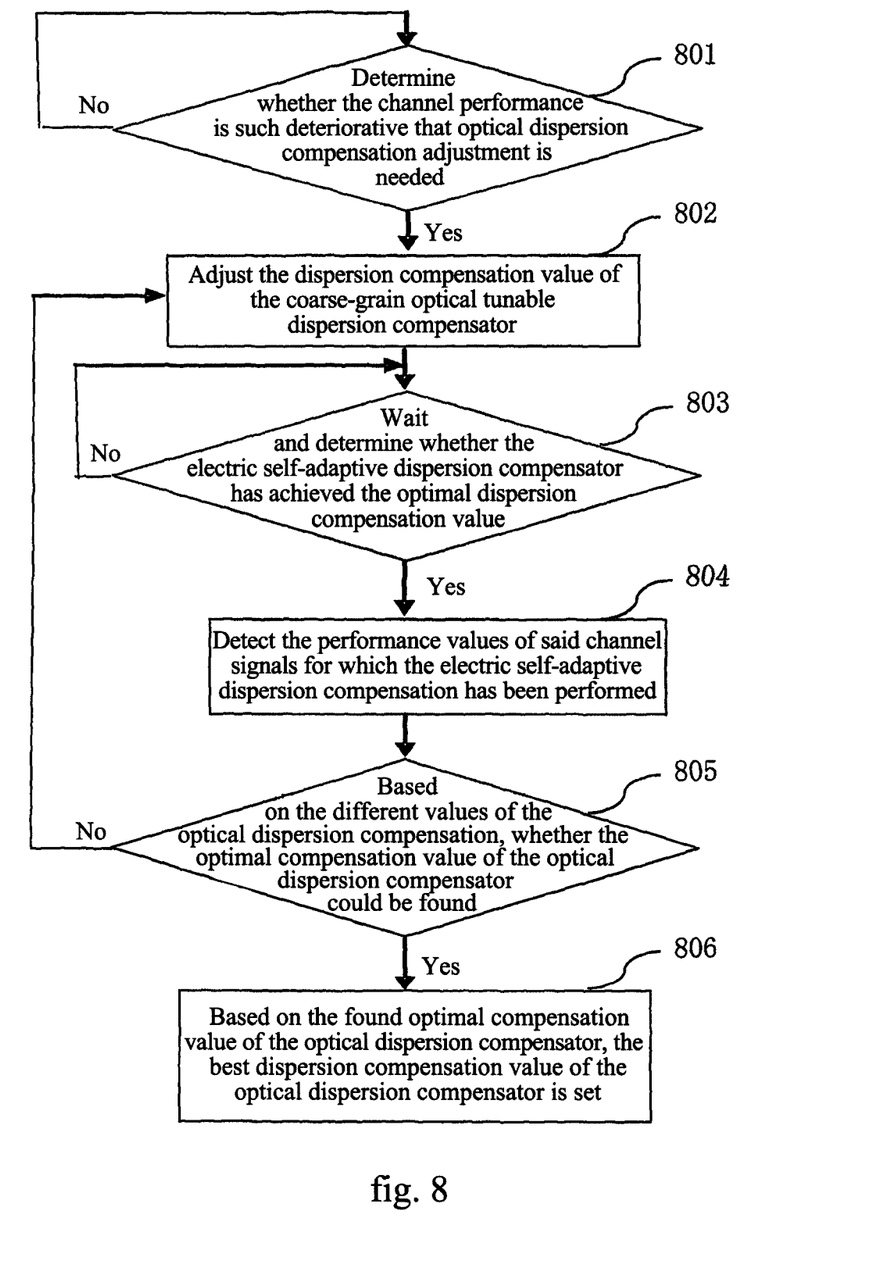
FIG. 8 is a flow chart for the realization method of the adaptive dispersion compensation according to the embodiment of the present invention.

FIG. 8 describes the flow chart of execution method and control scheme for adaptive dispersion compensation in present invention. The electric adaptive dispersion compensation is always working; control logic unit firstly determines whether the channel performance after electric adaptive dispersion compensation is such deteriorated that the optical dispersion compensation tuning is needed (step 801); if so, it starts to adjust the dispersion compensation value of the coarse-grain tunable dispersion compensator (step 802); after adjusting the dispersion compensation value of the coarse-grain tunable dispersion compensator each time and also determining whether the electric adaptive dispersion compensator reaches the optimal dispersion compensation value (step 803, it detects the performance parameters of said channel signals after electric adaptive dispersion compensation (step 804); furthermore, according to the comparison of the coarse-grain tunable dispersion compensator under different dispersion compensation conditions and based on the principle of optimizing the performance parameters of said channel signals after electric adaptive dispersion compensation, it analyzes to obtain the optimal dispersion compensation value of the optical dispersion compensator (step 805), with which, it finally sets the dispersion compensation value of the optical dispersion compensator as this optimal value, thus the adaptive dispersion compensation is completed (step 806).

For the adaptive dispersion compensation in the multi-channel system, after the multi-channel signal is divided into single-channel signals by the optical de-multiplexer, the optimal optical dispersion compensator value for each single channel is found for each single channel that needs dispersion compensation based on the scheme in FIG. 8, and then the optimal optical dispersion compensator value for all the individual channels is chosen; finally the dispersion compensation value of the optical dispersion compensator for each channel is set as this optimal value, thus the adaptive dispersion compensation is completed.

Figure 9:
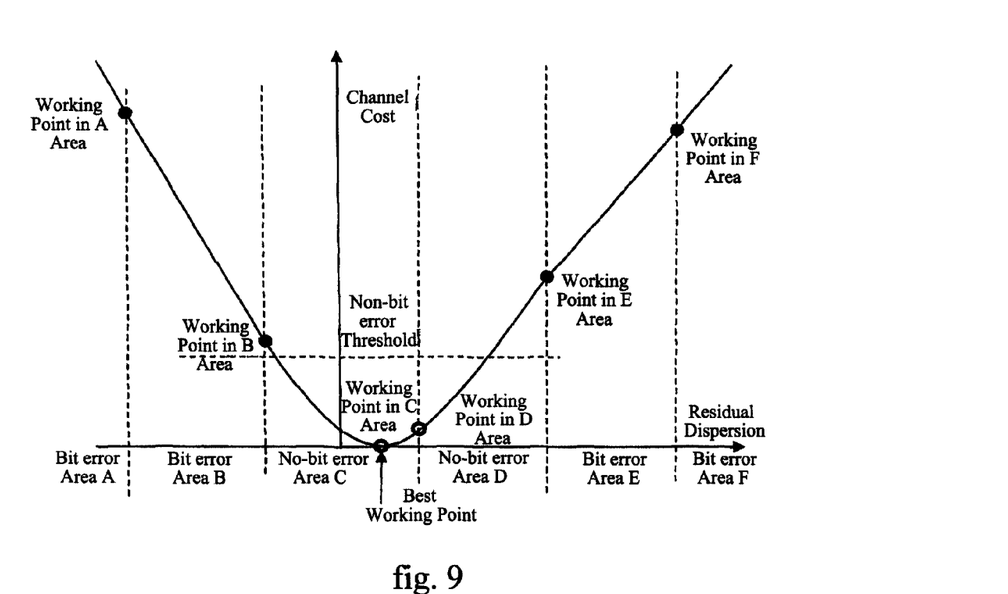
FIG. 9 is a distribution solution for the adaptive dispersion compensation according to the embodiment of the present invention.
Figure 10:
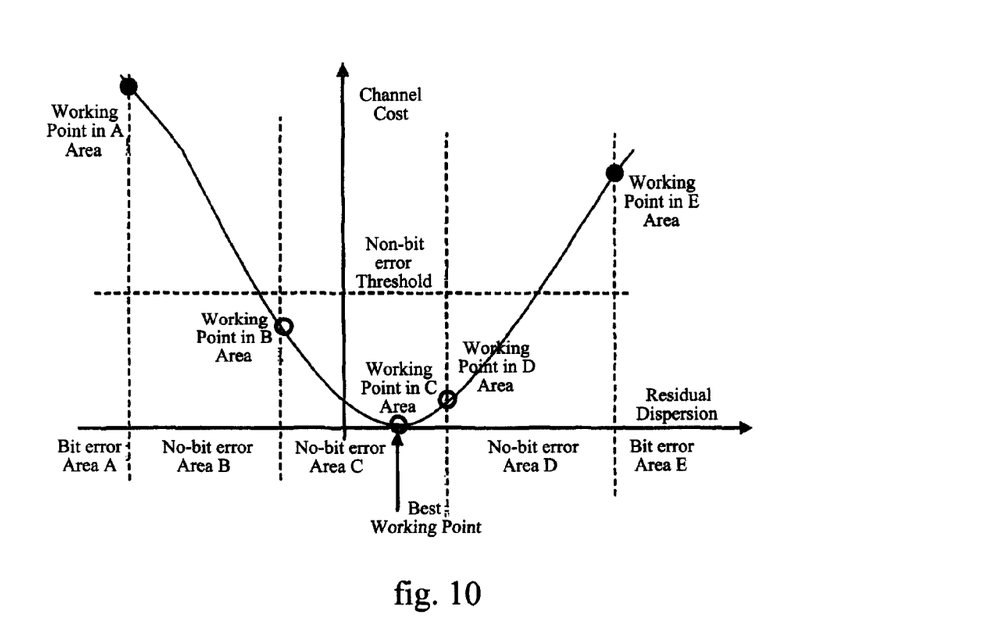
FIG. 10 is another distribution solution for the adaptive dispersion compensation according to the embodiment of the present invention.
Figure 11:
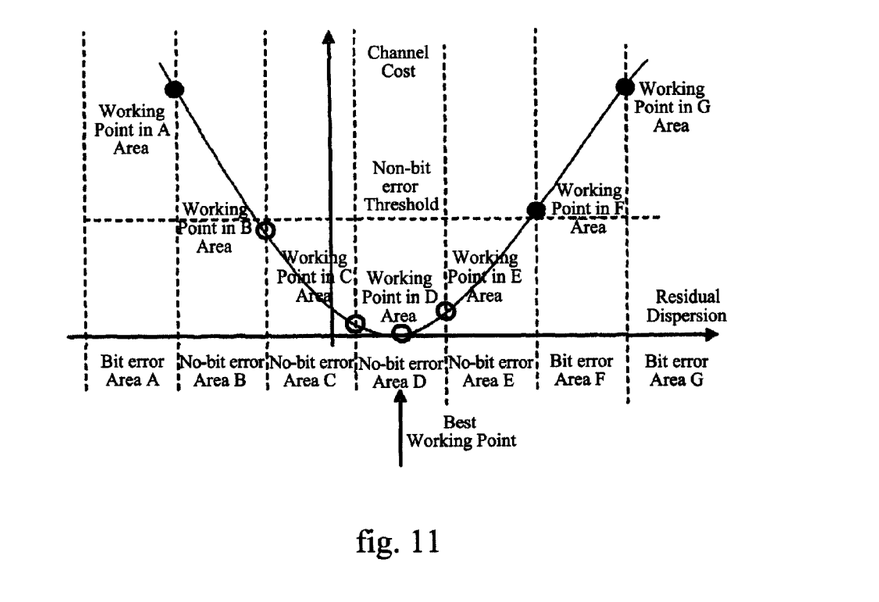
FIG. 11 is still a distribution solution for the adaptive dispersion compensation according to the embodiment of the present invention.

For the coarse-grain tunable dispersion compensator, the adjusting degree of accuracy dD could be determined by referring to the dispersion tolerance margin De of electric adaptive dispersion compensator; the FIGS. 9, 10 and 11 respectively reflect the corresponding relationships between the channel cost characteristics of said channel signals and the system residual dispersion when the adjustment accuracies dD are De, ½ De and ⅓ De respectively after using the electric adaptive dispersion compensation procedures. The performance parameters of said channel signals after the electric adaptive dispersion compensation could be the bit error characteristic and Q value etc. of the channel. The obtaining of the best dispersion compensation value of the optical dispersion compensator could be realized by detecting the bit error, Q value or other parameters that could reflect signal quality of said channel signal after the electric adaptive dispersion compensation. For the system that uses the FEC technology, it could also be the error rate detected by FEC before correction. The term of the bit error or Q value of the channel signal is directly related to the channel cost in the figures.

By using the bit error, Q value or other parameters that could reflect signal quality of said channel signal after the electric adaptive dispersion compensation, we analyzes to get the optimal dispersion compensation value of the optical dispersion compensator by employing various schemes. A simple scheme that uses bit error detection in the single-channel system will be described with reference to FIG. 9 in the following part.

In reality, the dispersion compensation value of the coarse-grain optical dispersion compensator could change in a step fashion. In the beginning, the correct direction of step change can be determined according to the changes of channel bit error after the first two steps of compensation, and then whether the dispersion compensation value should be increased or decreased can be determined; afterwards, the dispersion compensation value of the coarse-grain optical dispersion compensator is increased or decreased towards the determined correct direction of step change until there is no bit error in the channel; the dispersion compensation is continually increased or decreased until the bit errors occur in the channel again. If there is only one corresponding step dispersion compensation value in the non-bit error situation, then the optimal dispersion compensation value is just that value; if there are multiple corresponding step dispersion compensation values in the non-bit error situation and there are an odd number of non-bit error areas, then the best working area is in the middle; when there are an even number of non-bit error areas, then based on the bit error rate corresponding to the step dispersion compensation values that are closest to the two sides of the dispersion compensation value without bit errors, the best non-bit error area can be determined. As shown in FIG. 11, areas A~F respectively represent the range of the residual dispersion values in the system under different compensation values of the optical dispersion compensators. The circle represents the residual dispersion value, namely the dispersion compensation working points of said channel, within this residual dispersion range after employing the electric adaptive dispersion compensation optimization. It could be seen that under different compensation values of the optical dispersion compensators, the system bit error performances are different. For example, for the A, B, E, F areas in FIG. 11, the optical channel has bit errors, however, for the C, D areas, since the designed bit error rate is lower than the detected non-bit error threshold, the system detects no bit errors. By comparing bit errors of B and E areas, it is found that the bit error rate of B area is lower, therefore, it can be determined that the C area that is adjacent to the B area is the optimal dispersion compensation area, namely the compensation value of the optical dispersion compensator. The working point that is pointed to by the arrow in FIG. 11 is just the optimal dispersion compensation working point for said channel.

FIGS. 10, 11 show the bit errors of the dispersion compensation working points under more elaborate adjustment accuracy. As the same, the position pointed to by the arrow in the figure is the optimal dispersion compensation working point of the system.

For the multi-channel system, the bit error detection results from different channels can be provided to the control logic unit; based on the bit error in each channel, the control logic unit comprehensively finds out the optimal setting value of dispersion compensation for the optical tunable dispersion compensator when there is no bit error in all channels.

Because the dispersion compensation of the optical dispersion compensator is relatively rough, and the tolerance range of the single compensation is relatively large, by combining with the electric adaptive dispersion compensator, the optimal dispersion compensation point can be quickly found out, which significantly reduces the adjusting time, therefore reducing the dispersion compensation time.

Figure 12:
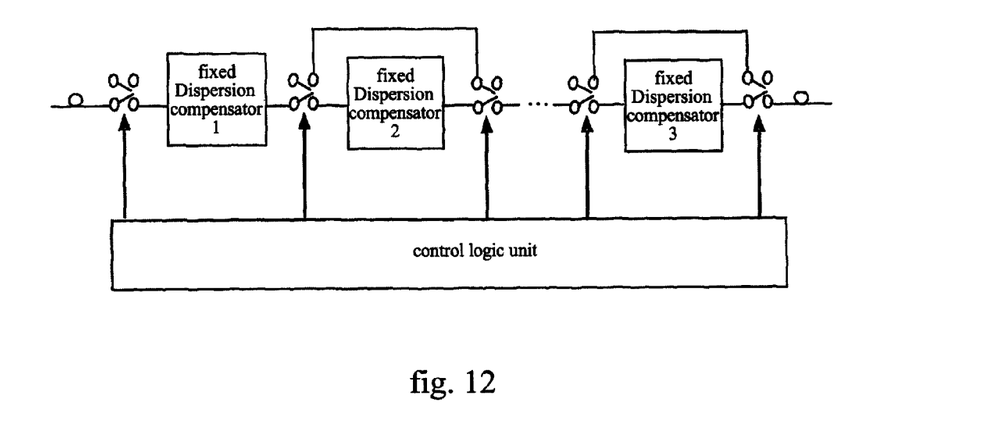
FIG. 12 is a principle diagram for the rough tunable dispersion compensation that is realized by using optical switch and fixed dispersion compensator according to the embodiment of the present invention.

On the other hand, a precise optical dispersion compensator mostly employs the tunable FBG or VIPA technology based tunable dispersion compensator, and has longer response time, while the rough optical dispersion compensator could use other technologies with faster response speed. For example, it could use multi-stage fixed dispersion compensators cascade, and uses the optical switch method to realize different dispersion compensation values. As shown in FIG. 12, by changing the make-and-break direction of the 2*2 optical switches, it could adjust the amount of the dispersion compensation. The dispersion compensation adjusting speed of the tunable dispersion compensator depends on the response time of the optical switch, which could reach the order of millisecond. The rough optical dispersion compensator could also be realized by using the integrated optical method. In a word, the rough optical dispersion compensator has much faster response speed.

In summary, by utilizing the rough optical dispersion compensator and electric adaptive dispersion compensator, the dispersion compensation time is significantly reduced when compared with other optical adaptive dispersion compensators.

INDUSTRY APPLICABILITY

The apparatus and the method for adaptive dispersion compensation provided in the present invention could perform adaptive dispersion compensation for single-channel or multi-channel system. By utilizing the rough optical dispersion compensator and electric adaptive dispersion compensator, as well as controlling the optical dispersion compensator through feedback by using control logic unit, it realizes the fast and accurate large-range compensation and significantly reduces the compensation time when compared with other optical adaptive dispersion compensators. The present invention could employ a variety of current optical tunable dispersion compensators and could perform dispersion adaptive compensation by monitoring different performance parameters; what's more, by using certain control scheme, it could realize the adaptive dispersion compensation in real time.

I claim:

1. An apparatus for adaptive dispersion compensation which is used for adaptive dispersion compensation in an optical communication system, comprising a receiver with an electric adaptive dispersion compensator, a control logic unit and a coarse-grain tunable dispersion compensator, wherein, the receiver with the electric adaptive dispersion compensator is configured to perform electric dispersion compensation for each single-channel electric signal obtained by photoelectric conversion and linear amplification of input optical signals;

the control logic unit is configured to determine whether a performance parameter value of the receiver, after the electric dispersion compensation has been performed, is deteriorated to the extent that optical dispersion compensation tuning is needed, and if the performance parameter value is deteriorated to the extent that the optical dispersion compensation tuning is needed, control the coarse-grain tunable dispersion compensator through feedback based on said performance parameter value to perform optical dispersion compensation adjustment for the input optical signals; and the coarse-grain tunable dispersion compensator is configured to perform optical dispersion compensation for the input optical signals based on the feedback controls of the control logic unit and to send to the receiver the input optical signals for which the optical dispersion compensation has been performed;

wherein the control logic unit is further configured to perform the following steps for multi-channel optical signals:

adjusting the optical dispersion compensation a plurality of times and recording a value of the optical dispersion compensation used in each adjustment as well as corresponding performance parameter values of the receiver after optical dispersion compensation and electric dispersion compensation have been performed;

based on the performance parameter value of the receiver after each adjustment, determining a preferred optical dispersion compensation value of each single-channel optical signal, and from these preferred optical dispersion compensation values, determining a preferred optical dispersion compensation value of the entire system, and using the preferred optical dispersion compensation value of the entire system to perform the optical dispersion compensation for said input optical signals;

the step of determining the preferred optical dispersion compensation value of each of the single-channel optical signals comprises:

selecting an optimal performance parameter of each of the single-channel optical signals from the performance parameters of the receiver after each adjustment, and determining the corresponding preferred optical dispersion compensation value based on the selected optimal performance parameter of the single-channel optical signals;

the step of determining preferred optical dispersion compensation value of the entire system comprises:

selecting an optimal performance parameter of the entire system from the preferred performance parameters of each of the single-channel optical signals, and determining the corresponding preferred optical dispersion compensation value of the entire system based on the selected optimal performance parameter of the entire system.

2. The apparatus in claim 1, wherein said coarse-grain tunable dispersion compensator is configured to perform the optical dispersion compensation, the range of which is greater than that of the electric dispersion compensation, for the input optical signals based on the feedback controls of the control logic unit.

3. The apparatus in claim 1, wherein said receiver has an internal electric adaptive dispersion compensator which is used to perform the electric dispersion compensation for single-channel signal, the range of which is smaller than that of the optical dispersion compensation.

4. The apparatus in claim 1, wherein said performance parameter value refers to a bit error rate of the single-channel electric signals, or Q value of the single-channel electric signals or a performance parameter value that reflects the quality of the single-channel electric signals.

5. The apparatus in claim 1, wherein when said optical communication system includes forward error correction technology, and said performance parameter value refers to a bit error rate before correction.

6. The apparatus in claim 1, wherein said coarse-grain tunable dispersion compensator is a tunable dispersion compensator including CFBG (Chirped Fiber Bragg Grating) technology, or
    a tunable dispersion compensator including G-T (Gires-Tournois) based interference technology, or
    a tunable dispersion compensator including MEMS (Micro Electro Mechanical Systems) based technology, or
    a tunable dispersion compensator including PLC (Planner Lightwave Circuit) spherical resonator technology, or
    devices using multi-stage fixed dispersion compensator cascade and using an optical switch to control different dispersion compensation values.

7. A method for adaptive dispersion compensation which is used for adaptive dispersion compensation in an optical communication system, comprising the following steps of:
    (1) performing at a receiver electric dispersion compensation with an electric adaptive dispersion compensator for received single-channel electric signals which are obtained by photoelectric conversion and linear amplification of input optical signals;
    (2) determining whether a performance parameter value of the single-channel electric signals for which the electric dispersion compensation has been performed is deteriorated to the extent that optical dispersion compensation tuning is needed, and if the performance parameter value is deteriorated to the extent that the optical dispersion compensation tuning is needed, performing optical dispersion compensation adjustment for the input optical signals based on said performance parameter value; and
    (3) performing optical dispersion compensation, based on the performance parameter value, with a coarse-grain tunable dispersion compensator and sending to the receiver the input optical signals for which the optical dispersion compensation has been performed, and performing the following for multi-channel optical signals:
        adjusting the optical dispersion compensation a plurality of times and recording a value of the optical dispersion compensation used in each adjustment as well as corresponding performance parameter values of the receiver after optical dispersion compensation and electric dispersion compensation have been performed;
        based on the performance parameter value of the receiver after each adjustment, determining a preferred optical dispersion compensation value of each single-channel optical signal, and from these preferred optical dispersion compensation values, determining a preferred optical dispersion compensation value of the entire system, and using the preferred optical dispersion compensation value of the entire system to perform the optical dispersion compensation for said input optical signals;
    the step of determining the preferred optical dispersion compensation value of each of the single-channel optical signals comprises:
        selecting an optimal performance parameter of each of the single-channel optical signals from the performance parameters of the receiver after each adjustment, and
        determining the corresponding preferred optical dispersion compensation value based on the selected optimal performance parameter of the single-channel optical signals;
    the step of determining preferred optical dispersion compensation value of the entire system comprises:
        selecting an optimal performance parameter of the entire system from the preferred performance parameters of each of the single-channel optical signals, and
        determining the corresponding preferred optical dispersion compensation value of the entire system based on the selected optimal performance parameter of the entire system.

8. The method in claim 7, wherein
In step (2), a control logic unit is arranged to measure the performance parameter value of said receiver after the electric dispersion compensation has been performed, control said coarse-grain tunable dispersion compensator through feedback based on said performance parameter value and perform the optical dispersion compensation adjustment for said input optical signals.

9. The method in claim 7, wherein said performance parameter value in step (2) refers to a bit error rate of the single-channel electric signals, or Q value of the single-channel electric signals or a performance parameter value that reflects the quality of the single-channel electric signals.

10. The method in claim 8, wherein said coarse-grain tunable dispersion compensator is a tunable dispersion compensator using CFBG (Chirped Fiber Bragg Grating) technology, or
    a tunable dispersion compensator using G-T (Gires-Tournois) based interference technology, or
    a tunable dispersion compensator using MEMS (Micro Electro Mechanical Systems) based technology, or
    a tunable dispersion compensator using PLC (Planner Lightwave Circuit) spherical resonator technology, or
    devices using multi-stage fixed dispersion compensator cascade and using an optical switch to control different dispersion compensation values.

11. An apparatus for adaptive dispersion compensation, which is used for adaptive dispersion compensation in a multi-channel optical communication system, comprising an optical de-multiplexer, multiple receivers with electric adaptive dispersion compensators, a control logic unit and a coarse-grain tunable dispersion compensator, wherein,
    the optical de-multiplexer is configured to de-multiplex input optical signals into multiple, single-channel optical signals;
    the multiple receivers with the electric adaptive dispersion compensators are configured to perform electric dispersion compensation for each single-channel electric signal obtained by photoelectric conversion and linear amplification of a corresponding one of the single-channel optical signals;
    the control logic unit is configured to determine whether a performance parameter value for all of the receivers, after the electric dispersion compensation has been performed, is deteriorated to the extent that optical dispersion compensation tuning is needed, and if the performance parameter value is deteriorated to the extent that the optical dispersion compensation tuning is needed, control the coarse-grain tunable dispersion compensator through feedback based on said performance parameter value and perform optical dispersion compensation tuning for the input optical signals; and the coarse-grain tunable dispersion compensator is configured to perform optical dispersion compensation for the input optical signals based on feedback controls of the control logic unit and send the input optical signals for which the optical dispersion compensation has been performed to the optical de-multiplexer wherein the control logic unit is further configured to
adjusting the optical dispersion compensation a plurality of times and recording a value of the optical dispersion compensation used in each adjustment as well as corresponding performance parameter values of each of the receivers after optical dispersion compensation and electric dispersion compensation have been performed;

based on the performance parameter values of the receivers after each adjustment, determining a preferred optical dispersion compensation value of each of the single-channel optical signals, and from these preferred optical dispersion compensation values, determining a preferred optical dispersion compensation value of the entire system, and using the preferred optical dispersion compensation value of the entire system to perform the optical dispersion compensation for said input optical signals;

the step of determining the preferred optical dispersion compensation value of each of the single-channel optical signals comprises:
selecting an optimal performance parameter of each of the single-channel optical signals from the performance parameters of the receiver after each adjustment, and
determining the corresponding preferred optical dispersion compensation value of each of the single-channel optical signals based on the selected optimal performance parameter of each of the single-channel optical signals;

the step of determining preferred optical dispersion compensation value of the entire system comprises:
selecting an optimal performance parameter of the entire system from the preferred performance parameters of each of the single-channel optical signals, and
determining the corresponding preferred optical dispersion compensation value of the entire system based on the selected optimal performance parameter of the entire system.

12. The apparatus in claim 11, wherein said coarse-grain tunable dispersion compensator is configured to perform the optical dispersion compensation, the range of which is greater than that of the electric dispersion compensation, for the input optical signals based on the feedback control of the control logic unit.

13. The apparatus in claim 11, wherein said receivers each comprise an internal electric adaptive dispersion compensator which is used to perform the electric dispersion compensation for the single-channel electric signals, the range of which is smaller than that of the optical dispersion compensation.

14. The apparatus in claim 11, wherein said performance parameter value is a bit error rate of the single-channel electric signals, or Q value of the single-channel electric signals or a parameter value that reflects quality of the single-channel electric signals.

15. The apparatus in claim 11, wherein when said multi-channel optical communication system includes forward error correction technology, and said performance parameter value refers to a bit error rate before correction.

16. The apparatus in claim 11, wherein said coarse-grain tunable dispersion compensator is a tunable dispersion compensator using CFBG (Chirped Fiber Bragg Grating) technology, or
a tunable dispersion compensator using G-T (Gires-Tournois) based interference technology, or
a tunable dispersion compensator using MEMS (Micro Electro Mechanical Systems) based technology, or
a tunable dispersion compensator using PLC (Planner Lightwave Circuit) spherical resonator technology, or
devices using multi-stage fixed dispersion compensator cascade and using an optical switch to control different dispersion compensation values.

17. A method for adaptive dispersion compensation, which is used for adaptive dispersion compensation in a multi-channel optical communication system, comprising the following steps of:
(1) de-multiplexing input optical signals into multiple single-channel optical signals;
(2) performing, at a receiver, electric dispersion compensation for each corresponding single-channel electric signal obtained by photoelectric conversion and linear amplification of the corresponding single-channel optical signal;
(3) determining whether a performance parameter value of the signals for which the electric dispersion compensation has been performed is deteriorated to the extent that optical dispersion compensation tuning is needed, and if the performance parameter value is deteriorated to the extent that the optical dispersion compensation tuning is needed, performing optical dispersion compensation adjustment for the input optical signals based on said performance parameter value; and
(4) performing optical dispersion compensation for the input optical signals and sending optical signals for which the optical dispersion compensation has been performed for de-multiplexing;

further comprising:
adjusting the optical dispersion compensation a plurality of times and recording a value of the optical dispersion compensation used in each adjustment as well as corresponding performance parameter values of each of the receivers after optical dispersion compensation and electric dispersion compensation have been performed;
based on the performance parameter value of the receivers after each adjustment, determining a preferred optical dispersion compensation value of each of the single-channel optical signals, and from these preferred optical dispersion compensation values, determining a preferred optical dispersion compensation value of the entire system, and using the preferred optical dispersion compensation value of the entire system to perform the optical dispersion compensation for said single-channel optical signals;
the step of determining the preferred optical dispersion compensation value of each of the single-channel optical signals comprises:

selecting an optimal performance parameter of each of the single-channel optical signals from the performance parameters of the receiver after each adjustment, and determining the corresponding preferred optical dispersion compensation value of each of the single-channel optical signals based on the selected optimal performance parameter of each of the single-channel optical signals;

the step of determining preferred optical dispersion compensation value of the entire system comprises:

selecting an optimal performance parameter of the entire system from the preferred performance parameters of each of the single-channel optical signals, and determining the corresponding preferred optical dispersion compensation value of the entire system based on the selected optimal performance parameter of the entire system.

18. The method in claim 17, wherein in said step (4) a coarse-grain tunable dispersion compensator is used to perform optical dispersion compensation for the input optical signals;

In step (1), an optical de-multiplexer is arranged to perform de-multiplexing for the input signals;

In step (3), a control logic unit is arranged to measure performance parameter value of said receiver after the electric dispersion compensation has been performed, control the optical dispersion compensation through feedback based on said performance parameter value and perform optical dispersion compensation adjustment for said input optical signals.

19. The method in claim 17, wherein the step of determining a preferred optical dispersion compensation value of each single-channel optical signal comprise:

selecting an optimum performance parameter value of each single-channel optical signal from the performance parameter values of the receiver after each adjustment and determining the corresponding optimum optical dispersion compensation value based on the optimum performance parameter value.

20. The method in claim 17, wherein said performance parameter value in step (3) refers to a bit error rate of the single-channel electric signal, or Q value of the single-channel electric signal or a parameter value that reflects quality of the single-channel electric signal.

21. The method in claim 18, wherein said coarse-grain tunable dispersion compensator is a tunable dispersion compensator with CFBG (Chirped Fiber Bragg Grating) technology, or a tunable dispersion compensator with G-T (Gires-Tournois) based interference technology, or a tunable dispersion compensator with MEMS (Micro Electro Mechanical Systems) based technology, or a tunable dispersion compensator with PLC (Planner Lightwave Circuit) spherical resonator technology, or devices including multi-stage fixed dispersion compensator cascade and using an optical switch to control different dispersion compensation values.

* * * * *